Sept. 9, 1952 P. DRYON 2,610,042
APPARATUS FOR WORKING PASTES
Filed Sept. 30, 1947 2 SHEETS—SHEET 1

Inventor
P. Dryon

Sept. 9, 1952 P. DRYON 2,610,042
APPARATUS FOR WORKING PASTES
Filed Sept. 30, 1947 2 SHEETS—SHEET 2
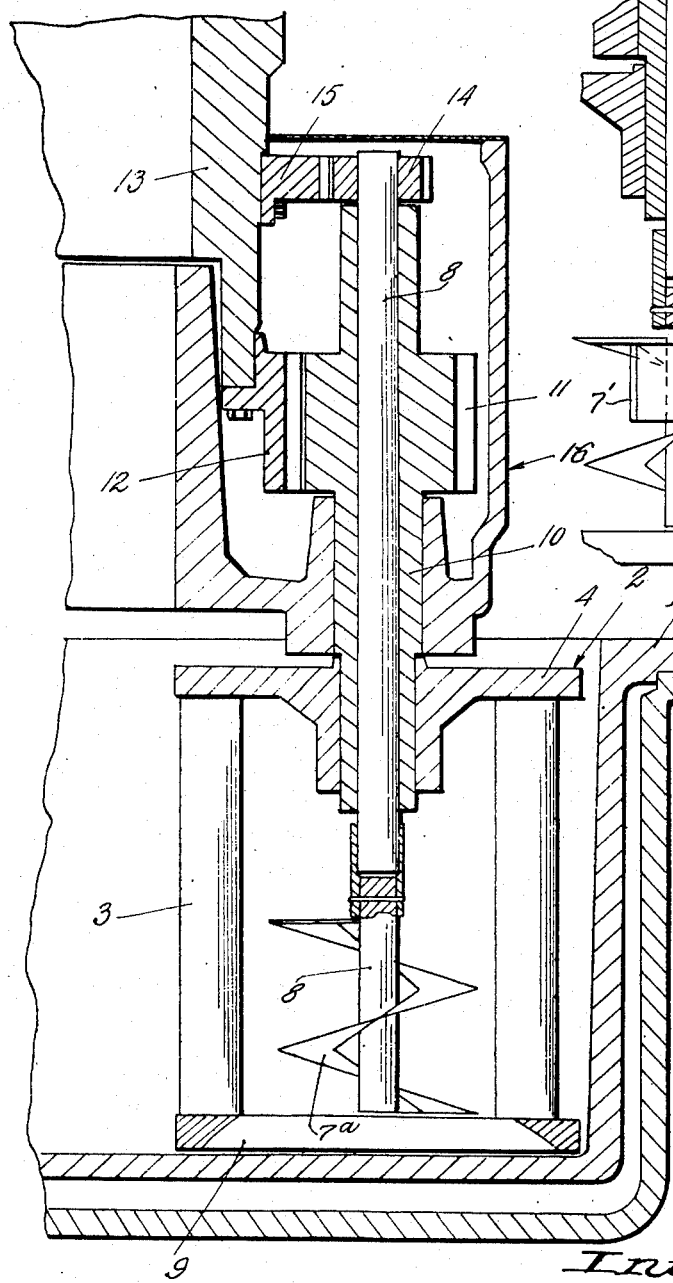
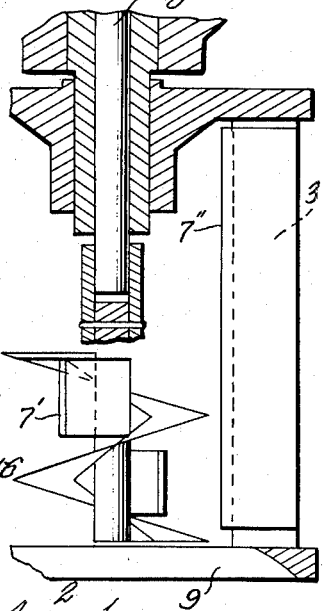
Inventor
P. Dryon Patented Sept. 9, 1952

2,610,042

UNITED STATES PATENT OFFICE 2,610,042

APPARATUS FOR WORKING PASTES

Paul Dryon, Auvelais, Belgium

Application September 30, 1947, Serial No. 776,962
In Belgium October 11, 1946

5 Claims. (Cl. 259—102)

The present invention relates to apparatus utilized for working or treating materials of pasty constituency such as chocolate pastes. More particularly the invention relates to mixing or stirring apparatus especially suitable for operation in conjunction with chocolate pastes for the purpose of forming an intimate mixture or homogenizing the same.

The invention specifically relates to a mixing or stirring apparatus of the type in which stirring devices are rotated about a generally vertical axis in a tank containing the paste and at the same time these stirring devices move through a more or less complex path within the tank. In apparatus of this kind, if it is desirable, the tank itself may be rotated about its own axis.

In further connection with mixing apparatus of this character, from the standpoint of constructional considerations the stirring devices are comprised by a plurality of arms secured in spaced relation in at least one supporting disc. The arms are spaced radially and circumferentially of the axis of rotation of the stirrer and together with the disc constitute a cage type stirrer rotatable about a vertical axis.

In connection with the operation of said stirring devices, during the movement thereof through the mass of chocolate paste within the tank, it has been determined that portions of the pasty material have a tendency to remain confined within the space between the arms of the stirrer, this confined paste therefore not partaking in the mixing and homogenizing operation since it merely moves as a blob or mass with the stirrer through the tank.

In view of the fact that the mixing and homogenization of chocolate pastes is a difficult operation and normally requires a mixing or stirring action of rather extended duration, the stirring apparatus of the type referred to provides an intimate mixture in a comparatively reduced time but at the same time has certain disadvantages. With stirrers of the type just described the chocolate pastes have a tendency to arrange themselves, that is to say segregate, in a series of superimposed horizontal layers that move slowly around the tank and additionally with stirrers of the type described portions of the pastes enter the central hollow space between the arms and plate or plates of the stirring devices and remains confined within this space.

It is therefore a primary object of the present invention to obviate these drawbacks of the prior art.

More particularly it is an object of the present invention to provide with stirring apparatus of the type described, means adapted to effect relative movement between the portion of the pasty materials confined between the arms of the stirring cage and the arms of the cage. Preferably the relative movement permits a constant flow of pasty material into and out of the hollow space comprised between the arms of the cage like stirring devices.

A further and more specific object is to provide a stirring apparatus of the type described in which the stirring devices incorporate means for imparting movement in a substantially vertical direction to the material that has entered the hollow space between the arms and which direction of movement necessarily differs from the preferential direction of movement of the balance of the pasty material being treated in the tank. Therefore the stirring device of the present invention will improve the mixing action by effecting an inter-mixing of the horizontal layers of the pastes while the same are moving around the tank.

A more specific object is to provide in a mixing apparatus of the type described, a stirring cage including the spaced arms supported for rotation about a generally vertical axis and which cage further includes a centrally disposed vertical shaft and which shaft is provided with means for imparting vertical movement to the portions of pasty material that enters the space between the arms. More specifically the said means constitutes at least one helix section mounted on the shaft.

Further and more specific objects will be apparent from the following description taken in connection with the accompanying drawings illustrating certain embodiments of the invention as particularly applied to the treatment of chocolate pastes.

In the drawings:

Figure 2 is a fragmentary sectional view on an enlarged scale illustrating a further embodiment of the invention;

Figure 4 is a fragmentary sectional view similar to Figure 2 but illustrating a further modification.

Figure 1:
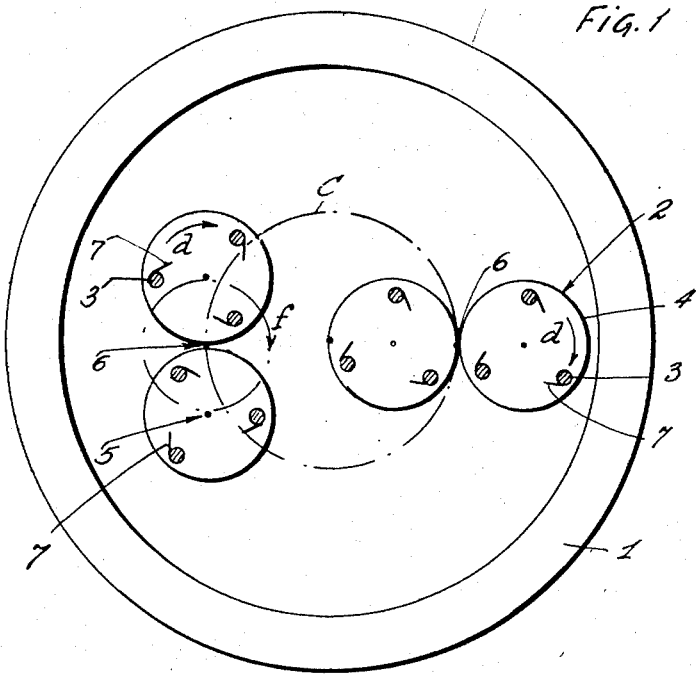
Figure 1 is a diagrammatic plan view of a mixing apparatus constructed in accordance with the invention.

With particular reference to the arrangement shown in Figure 1 the apparatus includes a mixing or homogenizing tank 1 adapted to contain the pastes to be treated and within which tank are disposed movable mixing devices or stirrers 2. The stirring devices are constructed in the form of cage like members, for example as shown in Figure 4. With particular reference to Figure 1, the stirring devices include a plurality of arms 3 which are radially and circumferentially spaced about a vertical center 5 and secured at one or both ends to the disc members 4. These disc members comprise upper and lower plates and together with the arms define a central hollow space. These stirrers are arranged in pairs as shown in Figure 1 and which pairs are distributed centrally about the central vertical axis of the tank. Each stirrer therefore is imbedded in the paste and surrounded on all sides by said paste. Means are provided in conjunction with one of the discs 4 which causes the stirrers to rotate about their own vertical axes denoted at 5 and each pair of stirrers rotates about the common vertical axis 6 of the pair and thus the stirrers move through the circular path F, while the pairs of stirrers are translated or carried through a circular path C concentric to the axis of the tank.

The driving mechanisms for moving the stirrer in the manner just described are well-known in the art and form no part of the present invention and for this reason have not been illustrated.

In mixing apparatus of the type just described and particularly when treating pasty material of marked consistency such as chocolate pastes, it has been found that portions of the materials would enter the space between the arms 3, have a tendency to remain within this space and remain undisturbed within the confines of the stirring cage. Therefore this confined material would take very little part in the mixing or homogenizing operation to which the balance of the pasty material in the tank is subjected.

To avoid this defect stirring devices of the present invention are provided with means operative to constantly and permanently renew the portions of pasty materials which enter the hollow space between the arms 3. As shown in Figure 1 such means comprise paddles 7 arranged as shown with regard to the direction of rotation of the stirrer, arrow d, so that the confined materials are caused to move in a radially outward direction thereby setting up internal movements of the material confined between the arms 3 so as to expel the material radially outward from between these arms thereby preventing the material from remaining confined in the cage like stirring devices. In other words the arrangement of paddles 7 in conjunction with the movement of the stirring devices 2 effects a circulation of the pasty material through the hollow space of the stirrers. The paddles 7 may occupy the entire length of each arm 3 or they may merely occupy portions of this length. The shape of the paddles may vary in width along their length and the paddles may be flat, curved and also be arranged along a linear or a helical generating line of the bars constituting the arms 3. Preferably in conjunction with this arrangement the arms 3 are adjustably mounted in the disc 4 to permit the direction of inclination of the paddle 7 to be adjusted so as to be able to impart to the paddle 7 a more or less greater inclination relative to the direction of movement of the path of the arm 3.

Additionally the flow of the material subjected to the circulation or renewal operation within the hollow space of the cage like stirring devices may be directed to some extent, for example by providing holes or perforations in the lower disc 4 of each cage.

With reference to Figure 2, the invention embodies means for effecting renewal of the portions of the materials confined between the arms 3 and the discs 4, constituting a central shaft 8 on which may be arranged paddles similar to the arrangement of the paddles 7 on the arms 3 of Figure 1. The shaft 8 may be motionless or receive a rotational movement which differs from the rotational movement of the particular stirring device 2.

In either case, during a mixing operation internal movements will be imparted to the materials in the space between the arms 3 and which internal movements result in the continuous circulation or expelling of part of the material from between the arms and the re-entering of that material within the balance of the pasty materials in the tank 1.

With particular reference to Figure 2 and as illustrated therein, the means for circulating or renewing the confined material between the arms 3 constitutes at least one helix section 7a operative to provide movement in a vertical direction to the materials between the arms. This movement can be effected either upwardly or downwardly or partly in either direction depending upon the number and particular disposition of the helix means.

Preferably the lower disc 4 constitutes either an annular ring or is otherwise slotted or apertured as shown at 9 to permit the pasty materials from the tank to pass within the space between the arms 3 or to pass from the space between the arms 3 into the tank depending of course upon the particular direction of the vertical component of motion imparted to the chocolate pastes.

If, under these conditions, the stirring device as viewed from above is rotating in a clockwise direction while the helix 7a is of right hand thread and the shaft 8 is motionless in its supporting bearing or sleeve, a downwardly directed movement will be imparted to the material located between the arms 3 and such confined material will be expelled from the hollow space between the arms 3 and will pass into the tank through the opening 9 in the bottom disc. Should the direction of rotation of the stirrer 2 and the thread direction of helix 7 remain the same while shaft 8 is rotated in the same direction as the stirrer but with a different speed of rotation, then the movement of the material confined between the arms 3 will be effected either downwardly or upwardly depending upon whether the rotational speed of the shaft 8 is lower or greater than the speed or revolution of the stirrer 2 about its own axis. It therefore follows that according to the value of the pitch of the helix member 7a and the speed of rotation of the shaft 8 including the zero speed, either direction of vertical movement may be obtained and the speed of such movement may be adjusted within very wide limits.

In the constructional illustration of Figure 2 it is assumed that the shaft 8 is rotated at a speed greater than the stirrer 2, the upper disc 4 of which is fixed to a sleeve 10 which is driven through the meshing engagement of the pinion 11 formed on the sleeve 10 with a ring gear 12 mounted on the frame. The shaft 8 carries a pinion 14 at the upper end thereof meshing with the toothed wheel or gear 15 on the frame 13. Supporting structure 16 which supports the stirrer and the shaft 8 is moved around the frame.

It will therefore be readily understood that the action of the renewing means just described which effects the movement of the material between the arms 3 will be more efficacious when there is a greater difference between the speed of rotation of the stirrer as compared with the speed of rotation of the shaft 8. Means for enabling the difference in rotational speeds of the shaft and stirrer to be increased while retaining a simplified constructional form of stirring device comprises means for reversing the direction of rotation of the shaft 8 relative to the stirrer. The helix 7a being embodied with either right or left hand thread construction according to the desired vertical direction that is to be imparted to the materials between the arms when the mixing apparatus is utilized.

Figure 3:
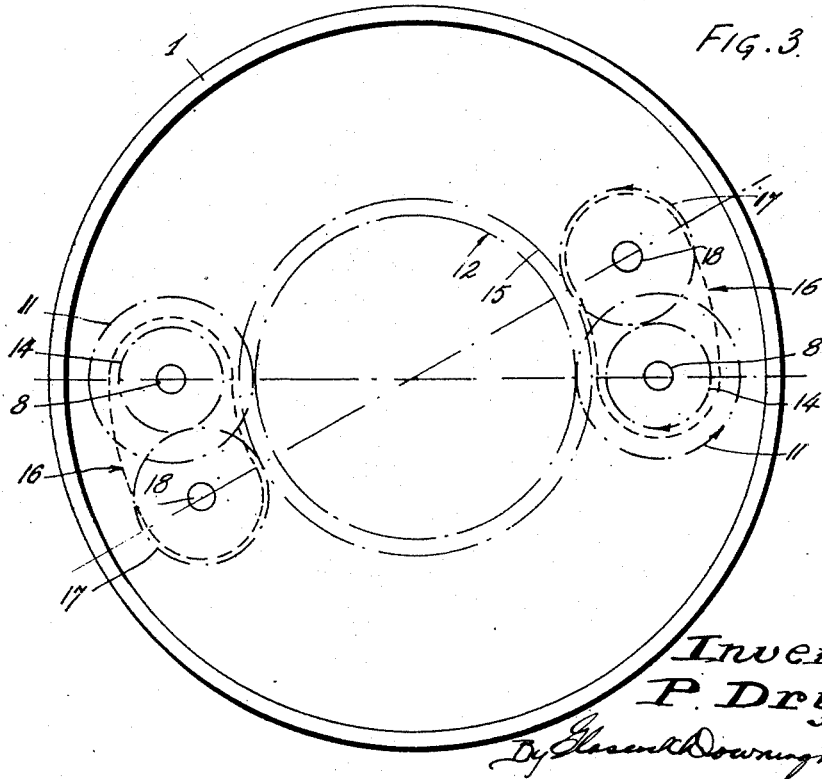
Figure 3 is a diagrammatic plan view of a modified form of the invention illustrated in Figure 2.

Figure 3 illustrates means for providing opposite rotating movements between the stirrer 2 and the shaft 8 while the stirrer is driven in the same manner as it was driven in the constructional form shown in Figure 2. In Figure 3 the stirrer is driven by pinion 11 meshing with the tooth wheel 12 on the frame of the apparatus. The shaft 8 carries a pinion 14 meshing with an intermediate pinion 17 mounted on a shaft 18 secured to the structure 16 that moves around the frame and which pinion 17 is in mesh with pinion 15 on the frame. Such arrangement obviously rotates the stirrer and shaft 8 in opposite directions.

The vertical movement which is imparted to the material that enters the space between the arms 3 not only counteracts the tendency of this material to remain confined between the arms but is also directed at substantial right angles to the internal, generally horizontal movements which are set up in the body of the material within the tank during the operation of the stirring or mixing apparatus. These horizontal movements especially occur in conjunction with pasty masses such as chocolate paste and thus the vertical movement imparted has a beneficial effect in insuring the intimate mixing and homogenization of chocolate pastes.

The present invention in addition to fulfilling its main purpose of preventing a portion of the material from remaining confined within the stirrers is also useful in the fulfilment of particular mixing and homogenizing conditions.

Therefore, it may be desirable to impart movements, such as vertical movements, to the masses of chocolate paste which are not the same at different levels within the tank, for example the levels at the top and bottom of the tank. These movements may differ as regards the speed of movement or as regards the direction of movement.

In such cases the shaft 8 may be provided with helix sections, the sizes or pitches or both being different at the various levels within the tank.

Additionally the effect of the helix means on the shaft 8 may be improved or completed in the manner shown in Figure 4 in which paddles 7' are arranged to extend radially of the shaft 8 while paddles 7" are provided on the arms 3 in the manner shown with reference to the embodiment of Figure 1.

It is therefore clear that the present invention provides an apparatus for treating pasty materials, particularly chocolate paste, which includes a mixing tank for containing the pastes within which are arranged movable and rotatable stirrers. The stirrers include vertically disposed arms which are arranged in spaced relation on a disc shaped support forming with the arm a cage having a central hollow space between the arms and which stirrers individually occupy a sector only of the mixing tank in an out of center position therein. It therefore follows that the stirrers are surrounded on substantially their entire periphery by a pasty material with the space between the arms providing for the entry of material therewithin. The apparatus further includes a vertically disposed and movable shaft which extends within this hollow space and devices including members arranged on the vertical shaft for imparting movements in a substantially vertical direction to any material having a tendency to remain confined within the hollow space. The apparatus further includes means for moving the stirrers and vertical shafts along predetermined paths in the tank and means to rotate the stirrers and further means to rotate the shaft. In a further feature of the invention the cage like stirrer includes an apertured disc like support permitting flow of the pasty material therethrough. More specifically the invention includes at least one helix section on the vertical shaft cooperable with means that rotate the stirrers and the vertical shafts in predetermined speed relation to the stirrers for imparting the movement to the material within the hollow space, such movement constantly expelling material from within this hollow space and permitting the entry by other portions of the material in the tank into said hollow space so as to provide a circulation of material in and through the space comprised between the arms 3 of the stirrer.

Having fully described my invention, what I claim as new and useful and desire to secure by Letters Patent of the United States is:

1. An apparatus for treating pasty materials as chocolate pastes, comprising a mixing tank, movable and rotatable stirrers in said tank, said stirrers including vertically disposed arms arranged in spaced relation on a disc shaped support to form a kind of cage with a central hollow space therebetween and individually occupying a sector only of the mixing tank in an out of centre position therein and surrounded on almost their entire periphery by pasty material whereby portions of said pasty material are liable to become confined within said central hollow space, a vertically disposed and movable shaft extending in said central hollow space, devices including members for imparting movements in substantially vertical direction to the said confined material arranged on the said vertical shaft, means for moving the stirrers and vertical shafts along predetermined paths in the tank, means to rotate the stirrers and means to move the said shafts.

2. An appaatus as in claim 1 including an apertured disc shaped support.

3. An apparatus for treating pasty materials, as chocolate pastes, comprising a mixing tank, movable and rotatable stirrers in said tank, said stirrers including vertically disposed arms arranged in spaced relation on a disc shaped and apertured support to form a kind of cage with a central hollow space therebetween and individually occupying a sector only of the mixing tank in an out of centre position therein and surrounded on almost their entire periphery by pasty material whereby portions of said pasty material are liable to become confined within said central hollow space, a vertically disposed and rotatable shaft extending in said central hollow space, at least one helix section on said shaft, means for moving the stirrers and vertical shafts along predetermined paths in the tank, means to rotate the stirrers and means to rotate the said shafts in predetermined speed relation to the stirrers, whereby the said portions of confined material may be expelled from within said central hollow space of the stirrers in the tank and other portions of the materials in the tank may enter the said central hollow space of the stirrers.

4. An apparatus for treating pasty materials, as chocolate pastes, comprising a mixing tank, movable and rotatable stirrers in said tank, said stirrers including vertically disposed arms arranged in spaced relation on a disc shaped and apertured support to form a kind of cage with a central hollow space therebetween and individually occupying a sector only of the mixing tank in an out of centre position therein and surrounded on almost their entire periphery by pasty material whereby portions of said pasty material are liable to become confined within said central hollow space, a vertically disposed and rotatable shaft extending in said central hollow space, at least one helix section on said shaft, paddles on the arms, inclined in the direction of movement of said arms, means for moving the stirrers and vertical shafts along predetermined paths in the tank, means to rotate the stirrers and means to rotate the said shafts in predetermined speed relation to the stirrers, whereby the said confined portions of material may be expelled from within said central hollow space of the stirrers in the tank and other portions of the materials in the tank may enter the said central hollow space of the stirrers.

5. An apparatus as in claim 4, including paddles arranged on the said shafts.

PAUL DRYON.

REFERENCES CITED

The following references are of record in the file of this patent:

UNITED STATES PATENTS

| Number | Name | Date |
| --- | --- | --- |
| 209,033 | Folliott | Oct. 15, 1878 |
| 1,247,655 | Frame | Nov. 27, 1917 |
| 1,767,346 | Christiansen | June 24, 1930 |
| 2,115,742 | Newton | May 3, 1938 |
| 2,298,317 | Smith | Oct. 13, 1942 |